(12) United States Patent
Chen

(10) Patent No.: US 7,627,877 B2
(45) Date of Patent: Dec. 1, 2009

(54) OBJECTIVE LENS ACTUATOR AND OPTICAL PICKUP UNIT EMPLOYING THE SAME

(75) Inventor: Ga-Lane Chen, Fremont, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 731 days.

(21) Appl. No.: 11/301,580

(22) Filed: Dec. 13, 2005

(65) Prior Publication Data

US 2006/0130088 A1 Jun. 15, 2006

(30) Foreign Application Priority Data

Dec. 15, 2004 (CN) .......................... 2004 1 0077569

(51) Int. Cl.
*G11B 7/09* (2006.01)
*G11B 7/08* (2006.01)

(52) U.S. Cl. .................. 720/681; 369/44.14; 369/44.32

(58) Field of Classification Search ................ 720/681; 369/44.14, 44.15, 44.32; 310/309, 12, 313 B, 310/313 R See application file for complete search history.

(56) References Cited

U.S. PATENT DOCUMENTS

| | | | | |
|---|---|---|---|---|
| 3,158,762 | A * | 11/1964 | Horan ......................... | 310/331 |
| 4,742,260 | A * | 5/1988 | Shimizu et al. ......... | 310/323.16 |
| 5,055,731 | A * | 10/1991 | Nihei et al. ................. | 310/309 |
| 5,170,089 | A * | 12/1992 | Fulton ........................ | 310/328 |
| 5,724,324 | A | 3/1998 | Lee | |
| 5,801,472 | A * | 9/1998 | Wada et al. ................. | 310/309 |
| 5,920,978 | A * | 7/1999 | Koshikawa et al. ...... | 29/603.12 |
| 6,445,514 | B1 * | 9/2002 | Ohnstein et al. ............ | 359/813 |
| 6,829,202 | B2 | 12/2004 | Jeong | |
| 7,039,926 | B2 * | 5/2006 | Tezuka et al. ............... | 720/681 |
| 7,126,792 | B2 * | 10/2006 | Bonin et al. ............. | 360/234.7 |
| 7,149,060 | B2 * | 12/2006 | Yang et al. ................ | 360/294.3 |
| 7,263,039 | B2 * | 8/2007 | Yee .......................... | 369/44.14 |
| 2003/0156529 | A1 * | 8/2003 | Tajiri ........................... | 369/244 |
| 2004/0130978 | A1 | 7/2004 | Hatazawa | |

FOREIGN PATENT DOCUMENTS

| | | | |
|---|---|---|---|
| CN | 1494068 | A | 5/2004 |
| EP | 1426937 | A2 * | 6/2004 |
| JP | 62205540 | A * | 9/1987 |
| JP | 63048624 | A * | 3/1988 |
| JP | 63181128 | A * | 7/1988 |
| JP | 02139725 | A * | 5/1990 |

(Continued)

OTHER PUBLICATIONS

US 6,608,801, 8/2003, (withdrawn).

*Primary Examiner*—William J Klimowicz
(74) *Attorney, Agent, or Firm*—Clifford O. Chi

(57) ABSTRACT

An objective lens actuator includes a lens holder for receiving an objective lens, a first micro-actuator, and a second micro-actuator. The first micro-actuator is connected to the lens holder and is configured for driving the objective lens along a substantially radial direction of an optical disk. The second micro-actuator is connected to the lens holder and is configured for driving the objective lens substantially along a direction perpendicular to the optical disk.

15 Claims, 7 Drawing Sheets

FOREIGN PATENT DOCUMENTS

| | | | | |
|---|---|---|---|---|
| JP | 04092223 | A | * | 3/1992 |
| JP | 05205300 | A | * | 8/1993 |
| JP | 06103597 | A | * | 4/1994 |
| JP | 07093782 | A | * | 4/1995 |
| JP | 09035297 | A | * | 2/1997 |
| JP | 11-66585 | A | | 3/1999 |
| JP | 2004-318988 | A | | 11/2004 |
| TW | 522394 | | | 3/2003 |

* cited by examiner

OBJECTIVE LENS ACTUATOR AND OPTICAL PICKUP UNIT EMPLOYING THE SAME

BACKGROUND OF THE INVENTION

1. Field of the Invention

The present invention relates to an objective lens actuator and, more particularly, to an objective lens actuator which is capable of adjusting an objective lens at a high accuracy and an optical pickup unit employing the same.

2. Description of Related Art

In recent years, optical recording media, hereinafter called optical disks, such as CDs (compact disks), DVDs (digital versatile disks) and Blu-ray disks have been developed to be capable of recording a large capacity of information. The more information the disk is able to record, the higher the recording density is, provided that physical sizes of the different disks are the same. That is, spaces between adjacent tracks in the disks become closer, and the dimensions of the pits become smaller. These changes can be followed in a table as below.

| optical disk type | space between adjacent tracks | dimension of the pit |
| --- | --- | --- |
| CD | 1.6 µm | 830 nm |
| DVD | 0.74 µm | 400 nm |
| Blu-ray disk | 0.32 µm | 149 nm |

It is important whether a beam spot emitted from a pickup unit can illuminate on the current track and pit accurately High accuracy is especially crucial to the Blu-ray disk because the space between adjacent tracks is shortened to 0.32 µm. If the beam spot appreciably deviates from the current track, the beam spot may illuminate on the adjacent tracks. As a result, the pickup unit will be unable to gather correct signals based on the beam reflected from the disk.

As is well known, a conventional optical pickup unit generally utilizes an actuator to adjust a position of an objective lens to achieve high accuracy. The actuator moves the objective lens in a radial direction to find a desired track of the disk. Further, the actuator moves the objective lens in an axial direction to adjust the beam spot on desired track and pit.

FIG. 9 (Prior Art) represents a conventional objective lens actuator 100, which is employed in a CD or DVD reproducing/recording apparatus. The objective lens actuator 100 includes a yoke plate 110, a wire holder 120, a plurality of suspension wires 130, and a lens holder 140. On the yoke plate 110, there are two internal yokes 112, two external yokes 114, and two magnets 118. The two internal yokes 112 are symmetrically formed on the yoke plate 110 and are located beside the lens holder 140. The two external yokes 114 are positioned between the two internal yokes 112. The two magnets 118 are mounted on the two external yokes 114, respectively. The wire holder 120 is located at a side of the yoke plate 110. The suspension wires 130 connect the wire holder 120 and the lens holder 140. The suspension wires 130 movably support the lens holder 140. An objective lens 142 is set in the center of the lens holder 140. A focusing coil 144 is horizontally wound around the lens holder 140. Two rectangular tracking coils 146 are attached to opposite sides of the focusing coil 144. The two magnets 118 apply magnetic fluxes to both the focusing coil 144 and the two tracking coils 146. In an operation of the objective lens actuator 100, a current is applied to the focusing coil 144 or the two tracking coils 146 through the suspension wires 130, and, as a result, an electromagnetic force is generated in the objective lens actuator 100 so that the position of the objective lens 142 can be adjusted along with the lens holder 140.

However, the wire-driven objective lens actuator 100, operated by both the focusing coil 144 and the tracking coils 146, is problematic. The system is particularly problematic when the objective lens actuator 100 is used with a Blu-ray disk player for playing a Blu-ray disk having densely packed recording tracks and pits. That is, the movable range of the lens holder 140 is determined by both the focusing coil 144 and the tracking coils 146. Accordingly, it is difficult to adjust the objective lens 142 at a high enough accuracy.

Accordingly, what is needed is an objective lens actuator, which is capable of adjusting an objective lens at a high accuracy. What is also needed is an optical pickup unit employing such an objective lens actuator.

SUMMARY

According to one embodiment of the present invention, an objective lens actuator includes a lens holder for receiving an objective lens, a first micro-actuator, and a second micro-actuator. The first micro-actuator is connected to the lens holder and configured for driving the objective lens along a substantially radial direction of an optical disk. The second micro-actuator is connected to the lens holder and configured for driving the objective lens substantially along a direction perpendicular to the optical disk.

Another embodiment provides an optical pickup unit for an optical disk storage system. The optical pickup unit includes a light source, an objective lens, an optical detector, and an objective lens actuator. The light source generates a light beam. The objective lens focuses the light beam to an optical disk. The optical detector receives a return light beam reflected from the optical disk. The objective lens actuator includes a lens holder, a first micro-actuator, and a second micro-actuator. The lens holder is configured for receiving the objective lens. The first micro-actuator is connected to the lens holder and is configured for driving the objective lens along a substantially radial direction of the optical disk. The second micro-actuator is attached to the lens holder and is configured for driving the objective lens along a direction substantially perpendicular to the optical disk.

BRIEF DESCRIPTION OF THE DRAWINGS

The above-mentioned and other features and advantages of this invention will become more apparent, and the invention will be better understood by reference to the following description of embodiments of the invention, taken in conjunction with the accompanying drawings, wherein.

Figure 1:
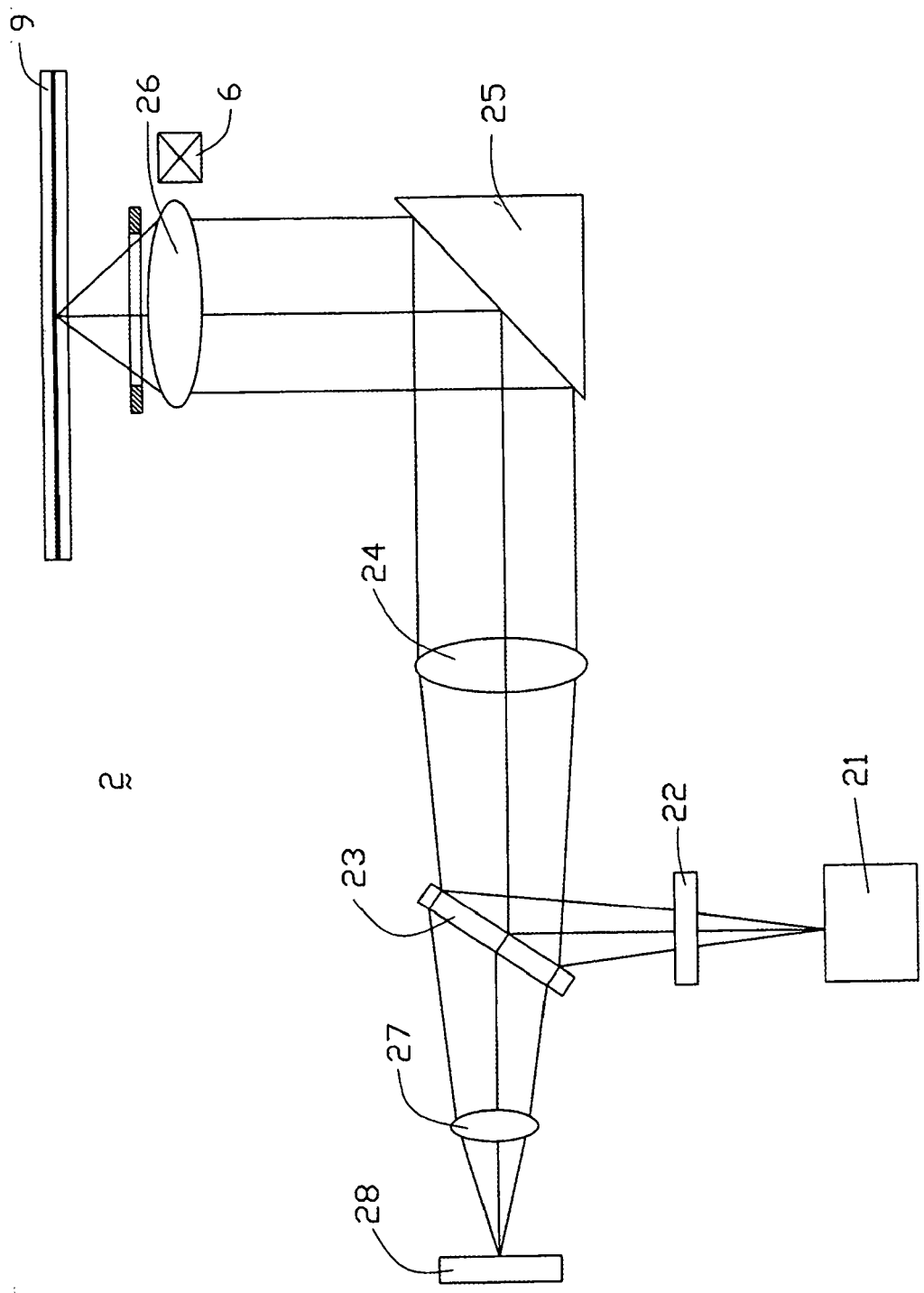
FIG. 1 is a schematic view showing an arrangement of optical elements of an optical pickup unit according to a preferred embodiment and also showing essential optical paths thereof.

Corresponding reference characters indicate corresponding parts throughout the several views. The exemplifications set out herein illustrate at least one preferred embodiment of the present optical pickup unit, in one form, and such exemplifications are not to be construed as limiting the scope of the device in any manner.

DETAILED DESCRIPTION OF PREFERRED EMBODIMENTS

Reference will now be made to the drawing figures to describe, at least, the preferred embodiment of the present optical pickup unit, in detail.

Referring to FIG. 1, an optical pickup unit 2 employing an objective lens actuator 6, according to a preferred embodiment, is illustrated. The optical pickup unit 2 further includes a light source 21, a diffraction element 22, an optical splitter 23, a collimator 24, a reflector 25, an objective lens 26, a cylindrical lens 27, and an optical detector 28. The objective lens 26 is adjustably attached to the objective lens actuator 6.

The light source 21 may be a semiconductor laser for generating a light beam with a certain wavelength. The diffraction element 22 is located next to the light source 21, for splitting the light beam emitted from the light source 21 into a primary light beam and two secondary light beams. The primary light beam is used for recording/reproducing information onto/from an optical disk 9. The secondary light beams are used for tracking tracks on the optical disk 9. A portion of the light beams transmitted from the diffraction element 22 passes through the optical splitter 23, and then is directed by the optical splitter 23 to be incident on the cylindrical lens 27. The light beams pass through the cylindrical lens 27, and are received by the optical detector 28. The optical detector 28 instantly controls and adjusts an output power of the light source 21 according to an intensity of the received light beams.

At the same time, the rest part of the light beams emitted from the diffraction element 22 is reflected by the optical splitter 22, and is directed to the collimator 24. The collimator 24 converts the light beams into parallel light beams. The parallel light beams are reflected by the reflector 25, so as to be incident on the objective lens 26. The objective lens 26 focuses the parallel light beams on the optical disk 9. The optical disk 9 reflects the incident light beams as the light beams return. The return light beams sequentially pass through the objective lens 26, the reflector 25, the collimator 24, the optical splitter 23, and the cylindrical lens 27, and are then received by the optical detector 28. The optical detector 28 converts the received return laser beams into electrical signals and servo signals and transmits these signals to a control/process circuit (not shown). The control/process circuit then controls the objective lens actuator 6 to adjust the objective lens 26.

Figure 2:
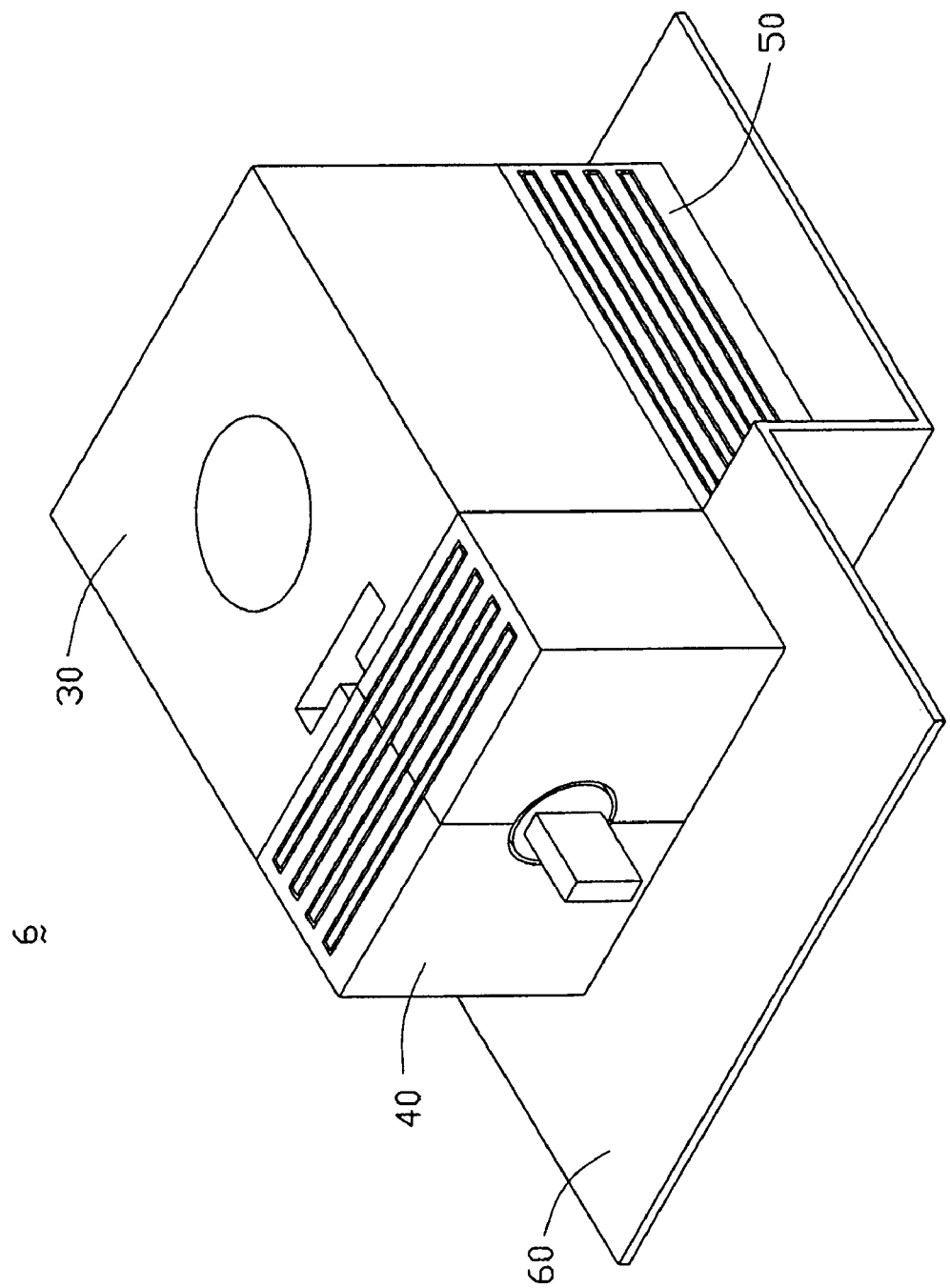
FIG. 2 is an enlarged, schematic view of an objective lens actuator of FIG. 1.

Referring also to FIG. 2, the objective lens actuator 6, according to the preferred embodiment, is illustrated. The objective lens actuator 6 includes a lens holder 30, first and second micro-actuators 40, 50, and a supporting member 60. The lens holder 30 connects to the first micro-actuator 40 and is supported by the second micro-actuator 50. The supporting member 60 is step-shaped for supporting the first and second micro-actuators 40, 50.

Figure 3:
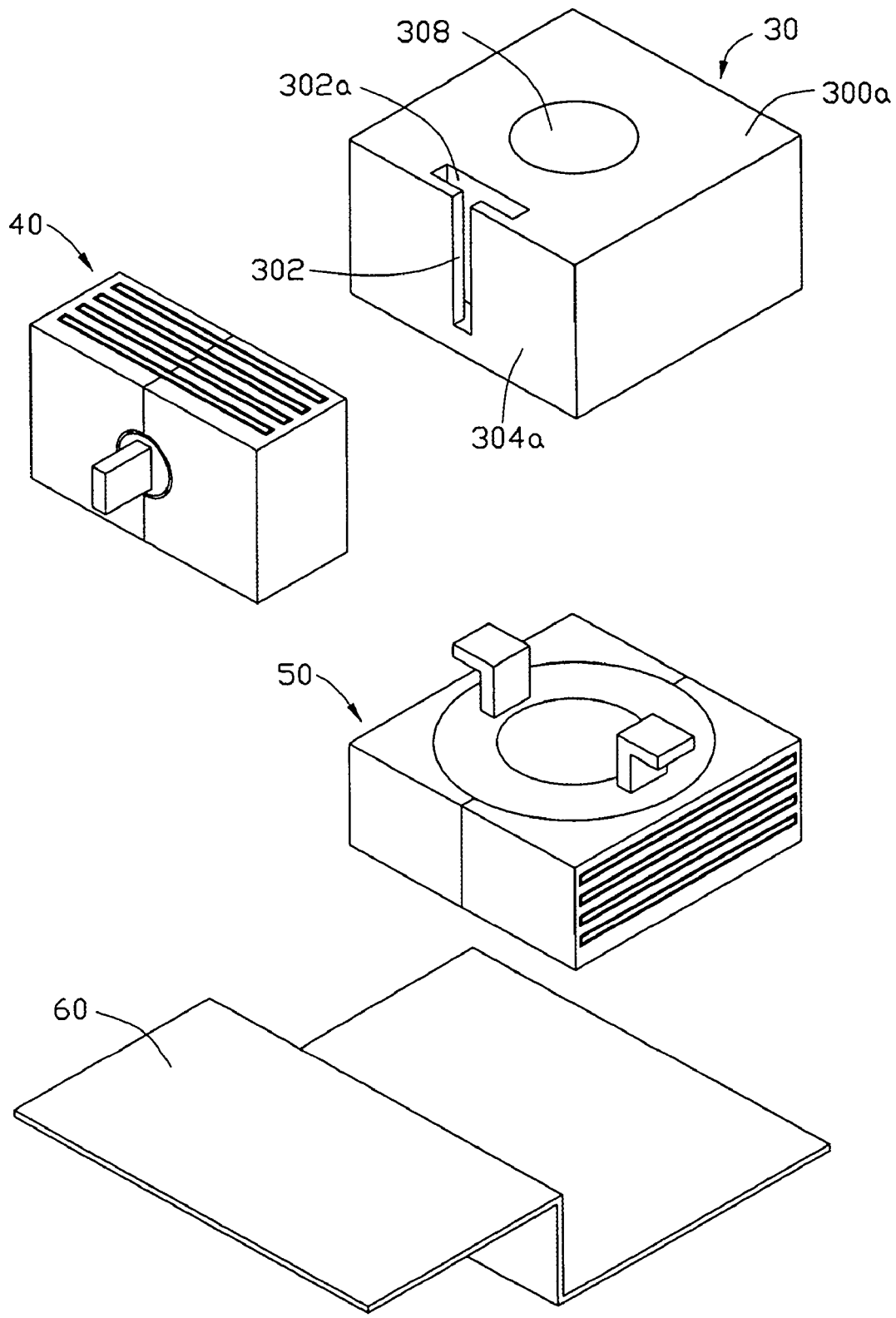
FIG. 3 is an enlarged, exploded view of the objective lens actuator of FIG. 1, with a supporting member of the objective lens actuator being removed.
Figure 4:
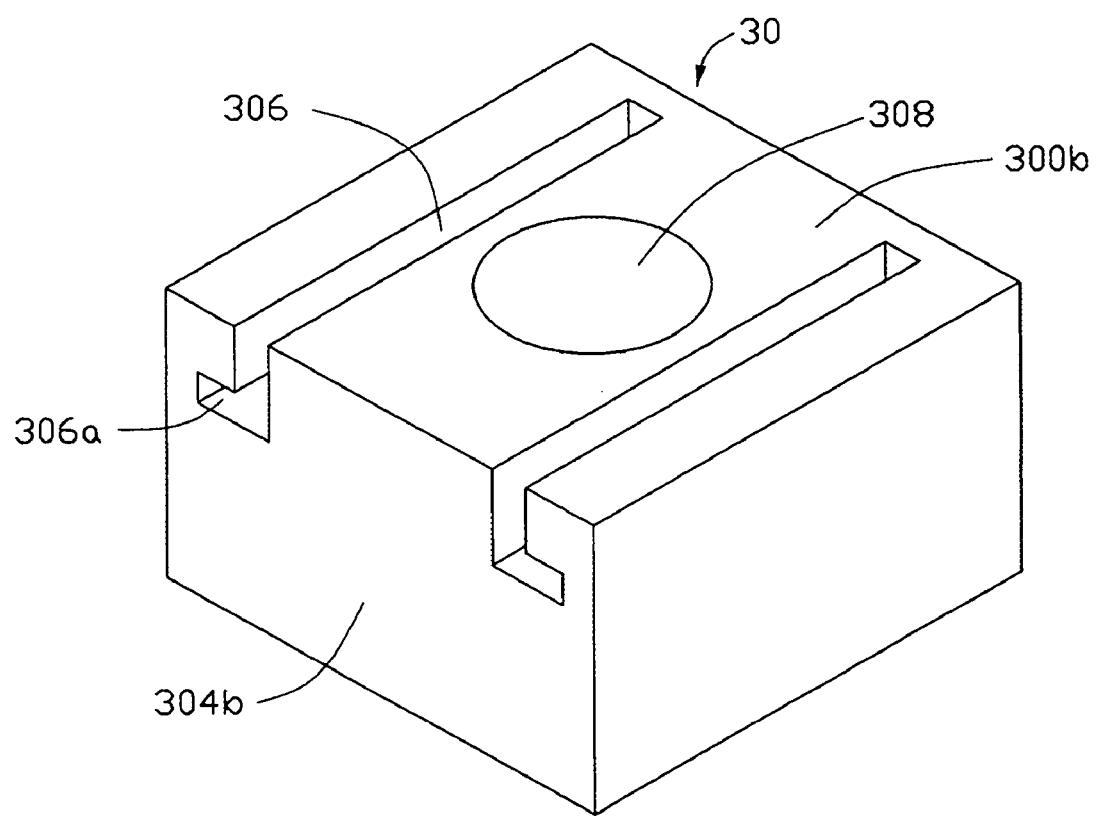
FIG. 4 is an enlarged, bottom view of a lens holder of the objective lens actuator of FIG. 2.

Referring also to FIGS. 3 and 4, the objective lens holder 30 is a shell or box shape. The objective lens holder 30 includes an upside 300a, a downside 300b, a first groove 302, first and second side surfaces 304a, 304b, a pair of second grooves 306, and a lens opening 308. The first groove 302 extends along the first side surface 304a, with T-shaped first openings 302a being formed on the upside 300a. The pair of second grooves 306 is parallel to each other and extends along the downside 300b, with L-shaped second openings 306a being formed on the second side surface 304b opposite to the first side surface 304a. The lens opening 308, which is capable of mounting an objective lens (not shown) therein, extends through the objective lens holder 30 from the downside 300b to its interior. The objective lens 26 may be either integrally formed with the lens holder 30 or manufactured individually. With the help of the first and second grooves 302, 306, the first and second micro-actuators 40, 50 are moveably attached to the first side surface 304a and the downside 300b, respectively.

Figure 5:
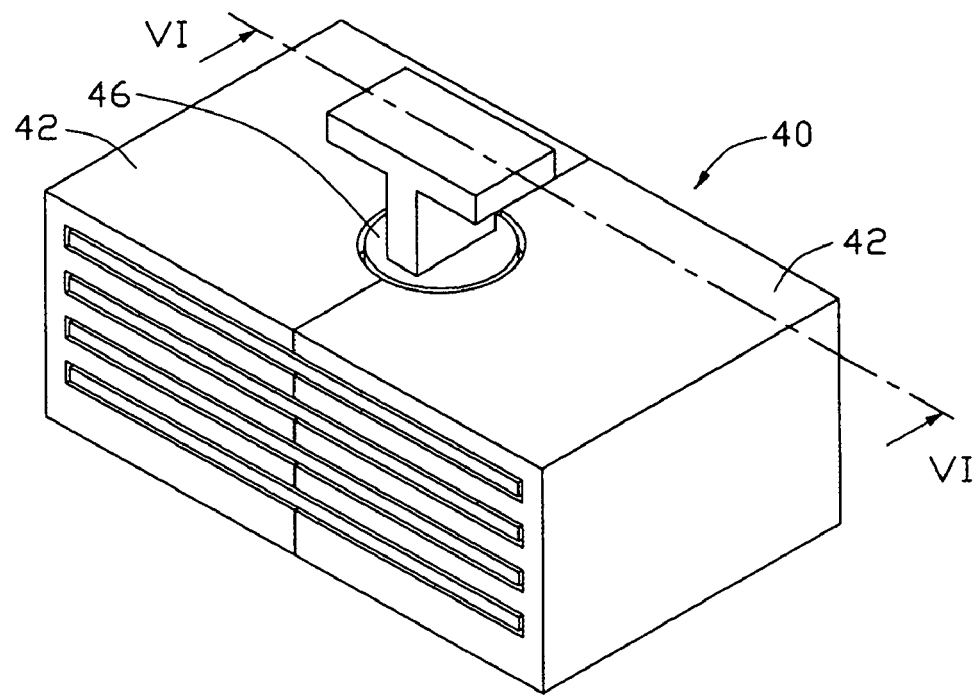
FIG. 5 is an enlarged, schematic view of a first micro-actuator of the objective lens actuator of FIG. 2.
Figure 6:
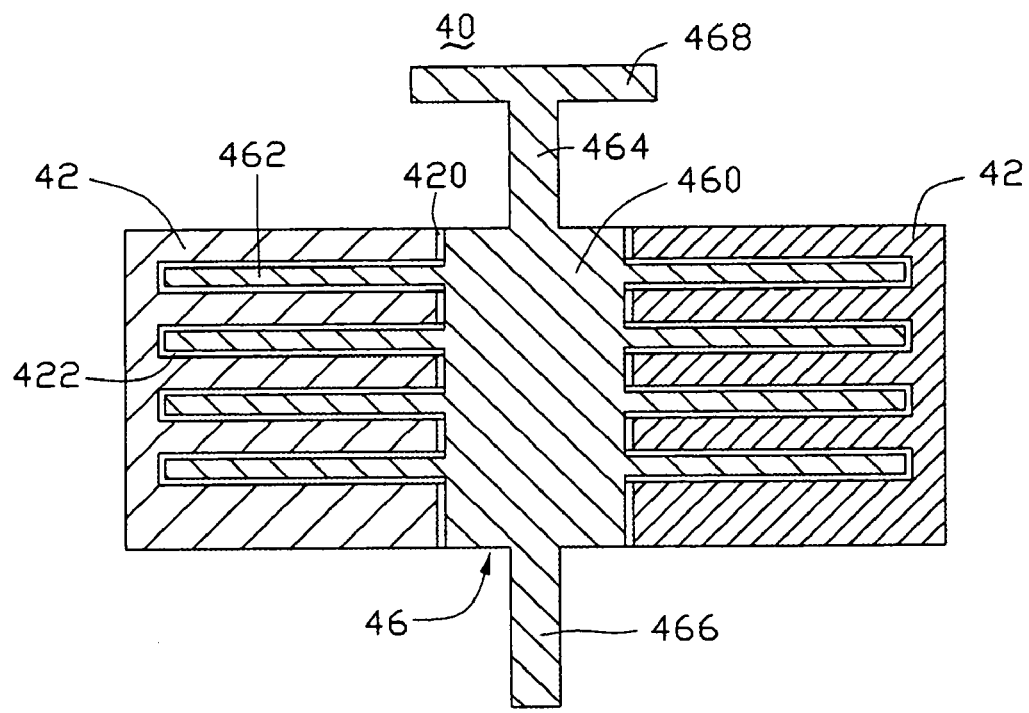
FIG. 6 is a cross-sectional view of the first micro-actuator of FIG. 4, taken along line VI-VI thereof.

Referring also to FIGS. 5 and 6, the first micro-actuator 40 can be made, e.g., of polycrystalline silicon, single crystalline silicon, aluminum or nickel. The first micro-actuator 40 includes a pair of first inactive portions 42 and a first active portion 46. A first through hole 420 is defined when the pair of first inactive portions 42 joins together. Each first inactive portion 42 is comb-shaped with a plurality of first slots 422. The first active portion 46 includes a first shaft 460 and a plurality of first comb fingers 462 extending from a circumference of the first shaft 460. One end of the first shaft 460 extends a certain distance to form a first electrode 464. The other end of the first shaft 460 also extends a certain distance to form a second electrode 466. The first and second electrodes 464, 466 connect to a control/process circuit (not shown) for receiving tracking signals.

At the end of the first electrode 464, there is a first stop portion 468. The first electrode 464 and the first stop portion 468 together form a T-shape in order to be slidably received in the first groove 302 via the first opening 302a (shown in FIG. 2). The first comb fingers 462 insert into the first slots 422, respectively, and the first shaft 460 is received in the first through hole 420. There are predetermined gaps between the first shaft 460 and first through hole 420, as well as the first comb fingers 462 and the first slots 422. These gaps are chosen so as to allow the first active portion 46 to be capable of moving in the first inactive portions 42, along an axial direction of the first shaft 460. The distance that each first active portion 46 is able to move is determined by the gaps (i.e., their sizes/configurations). The first stop portion 468 may push/pull the objective lens holder 30 along the axial direction of the first shaft 460. The axial direction of the first shaft 460 is parallel to a radial direction of the optical disk 9 (shown in FIG. 1). A static electricity force generates and is used as a driving force of the first micro-actuator 40 when a power supply unit (not shown) supplies voltages to the first and second electrodes 464, 466 and the first inactive portions 42. The driving force can move the first shaft 460 parallel to the optical disk 9. The moving direction of the first shaft 460 will be changed by alternating the direction of the voltages supplied to the first and second electrodes 464, 466.

Figure 7:
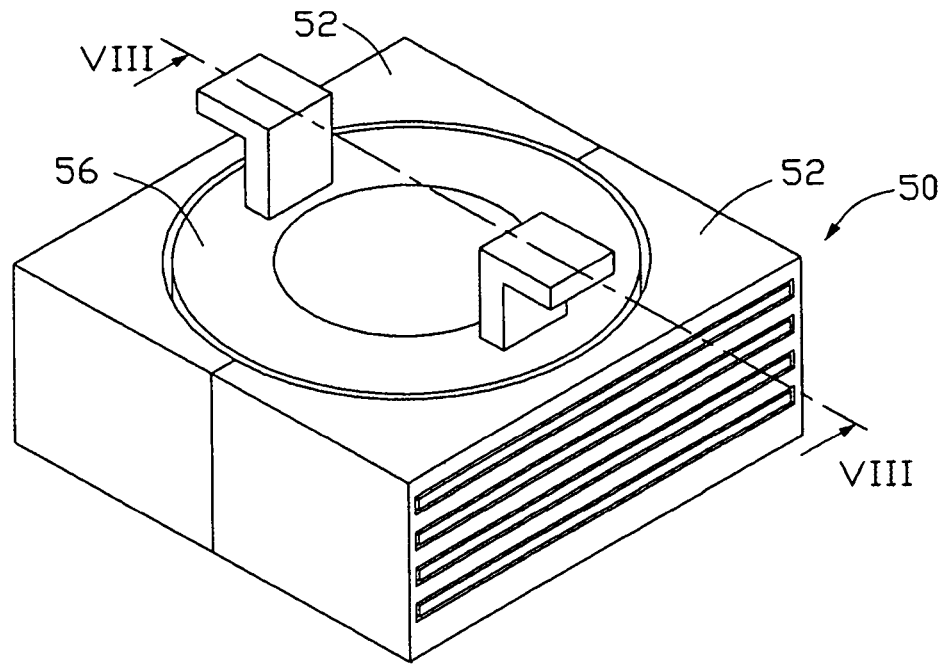
FIG. 7 is an enlarged, schematic view of a second micro-actuator of the objective lens actuator of FIG. 2.
Figure 8:
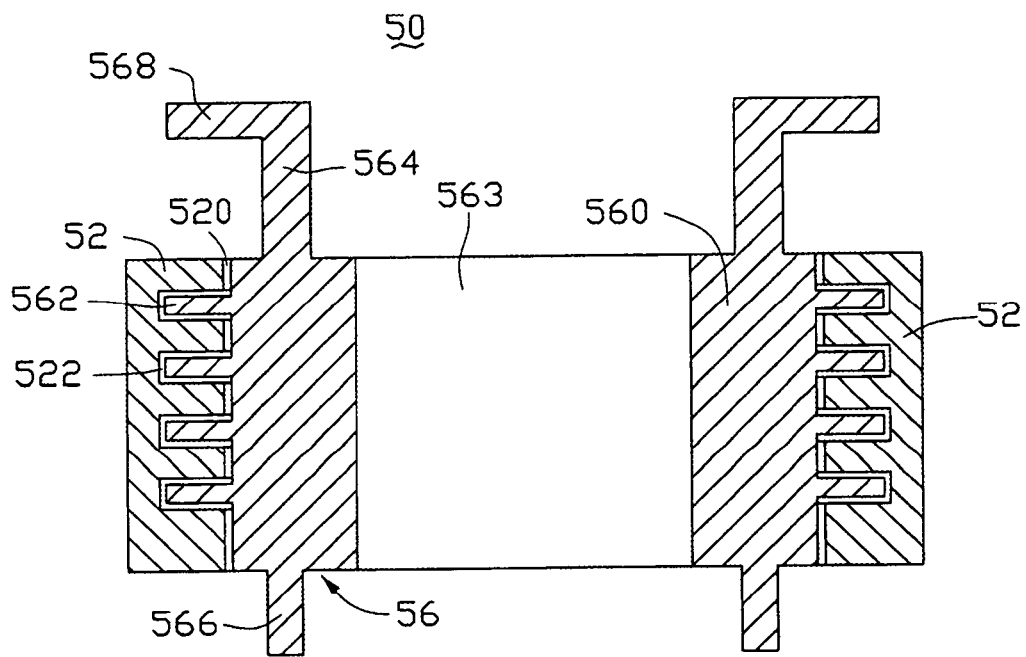
FIG. 8 is a cross-sectional view of the first micro-actuator of FIG. 6, taken along line VIII-VIII thereof.
Figure 9:
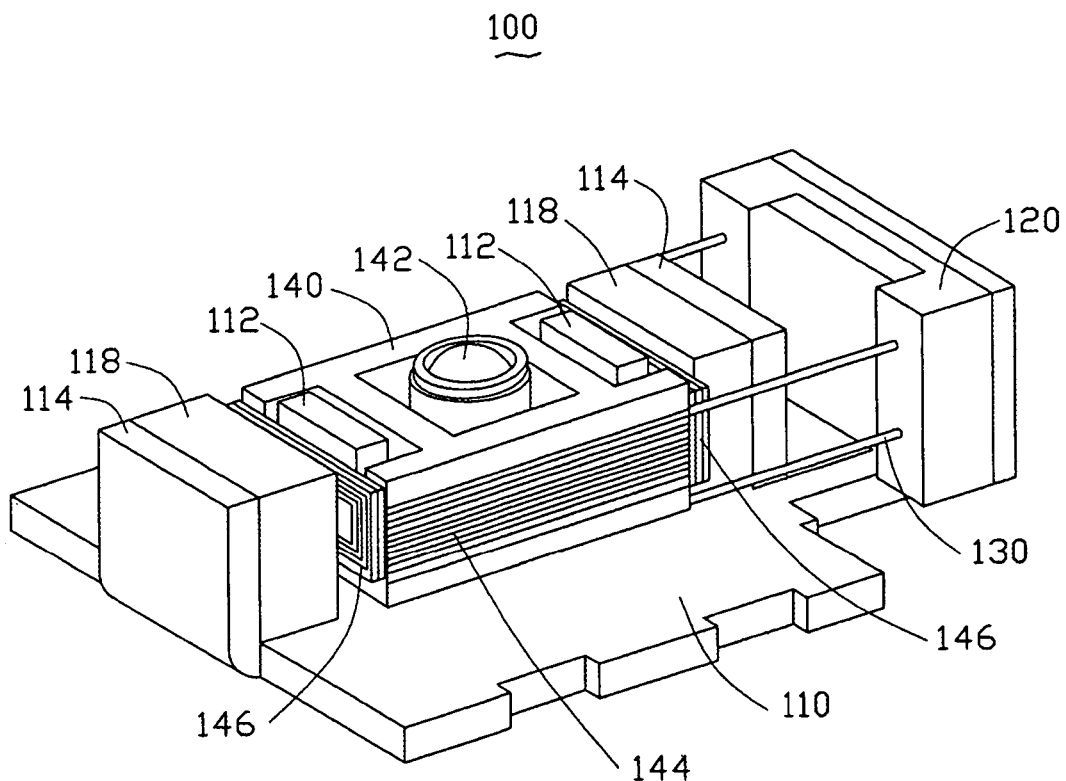
FIG. 9 is a schematic view of a conventional objective lens actuator.

Referring also to FIGS. 7 and 8, the second micro-actuator 50 is similar to the first micro-actuator 40 and is also made, e.g., of polycrystalline silicon, single crystalline silicon, aluminum or nickel. The second micro-actuator 50 includes a pair of second inactive portions 52 and a second active portion 56. A second through hole 520 can be defined when the pair of second inactive portions 52 connects together. Each second inactive portion 52 is comb-shaped, with a plurality of second slots 522. The second active portion 56 includes a second shaft 560 and a plurality of second comb fingers 562 extending from a circumference of the second shaft 560. There is a third through hole 563 formed along the axial direction of the second shaft 560. The third through hole 563 corresponds to the lens opening 308 and is thereby configured for permitting the light beams to pass therethrough.

One end of the second shaft 560 extends a certain distance to form a pair of third electrodes 564. The other end of the second shaft 560 also extends a certain distance to form a pair of fourth electrodes 566. The third and fourth electrodes 564, 566 connect to the control/process circuit (mentioned above) for receiving focusing signals. At the end of each third electrode 564, there is a second stop portion 568. The third electrode 564 and the second stop portion 568 together constitute an L-shape in order to be slidably received in the second grooves 306 from the second opening 306a (shown in FIG. 4). The second comb fingers 562 insert into the second slots 522, respectively, and the second shaft 560 is received in the second through hole 520. There are predetermined gaps between the second shaft 560 and the second through hole 520, as well as between the second comb fingers 562 and the second slots 522. These gaps allow the second active portion 56 to be capable of moving in the second inactive portions 52, along an axial direction of the second shaft 560. The distance that the second inactive portions 52 are able to move is determined by the gaps. The second stop portion 568 may push/pull the objective lens holder 30 along the axial direction of the second shaft 560. The axial direction of the second shaft 560 is perpendicular to the optical disk 9 (shown in FIG. 1). A static electricity force generates and is used as a driving force of the second micro-actuator 50 when the power supply unit (mentioned above) supplies voltages to the third and fourth electrodes 564, 566 and the second inactive portions 52. The driving force can move the second shaft 560 up and down, relative to the optical disk 9, by alternating the direction of the voltages supplied to the third and fourth electrodes 564, 566.

With the help of the objective lens actuator 6, a high accuracy, within 10 nm, of tracking and focusing is achievable. The requirement of the specification for the Blu-ray disk is satisfied.

Although the present invention has been described with reference to specific embodiments, it should be noted that the described embodiments are not necessarily exclusive. As such, various changes and modifications may be made to the described embodiments without departing from the scope of the invention as defined by the appended claims.

What is claimed is:

1. An objective lens actuator, comprising:
a lens holder configured for receiving an objective lens;
a first micro-actuator connected to the lens holder, the first micro-actuator being configured for driving the objective lens substantially along a radial direction of an optical disk; and
a second micro-actuator connected to the lens holder, the second micro-actuator being configured for driving the objective lens along a direction substantially perpendicular to the optical disk;
wherein the first and second micro-actuators each comprise at least one inactive portion and at least one active portion, the at least one active portion is movably received in the corresponding at least one inactive portion; the at least one inactive portion is comb-shaped with a plurality of slots therein, and the at least one active portion includes a shaft and a plurality of comb fingers extending from a circumference of the shaft.

2. The objective lens actuator as described in claim 1, wherein an objective lens is integrally formed with the lens holder.

3. The objective lens actuator as described in claim 1, wherein the comb fingers are received in the corresponding slots, the comb fingers being movable along the slots, an amount of movement therebetween being limited by predetermined gaps between the comb fingers and the slots.

4. The objective lens actuator as described in claim 1, wherein the shaft has a portion that protrudes out of the inactive portion, the protruding portion of the shaft having at least one stop portion determined at an end thereof.

5. The objective lens actuator as described in claim 4, wherein at least one receiving groove is defined in the lens holder for receiving a given stop portion.

6. The objective lens actuator as described in claim 5, wherein the shaft and the stop portion together define a T-shape.

7. The objective lens actuator as described in claim 6, wherein the receiving groove is T-shaped for movably receiving the T-shape formed by the shaft and the stop portion.

8. The objective lens actuator as described in claim 5, wherein the shaft and the stop portion together define a L-shape.

9. The objective lens actuator as described in claim 8, wherein the receiving groove is L-shaped for movably receiving the L-shape formed by the shaft and the stop portion.

10. The objective lens actuator as described in claim 1, wherein a through hole is defined along the axis of the shaft to let light beams pass therethrough.

11. An optical pickup unit, comprising:
a light source for generating a light beam;
an objective lens for focusing the light beam to an optical disk;
an optical detector for receiving a return light beam reflected from the optical disk; and
an objective lens actuator configured for driving the objective lens, the objective lens actuator comprising:
a lens holder for holding the objective lens;
a first micro-actuator connected to the lens holder, the first micro-actuator being configured for driving the objective lens along a substantially radial direction of an optical disk; and
a second micro-actuator connecting to the lens holder, the second micro-actuator being configured for driving the objective lens along a direction substantially perpendicular to the optical disk;
wherein the first and second micro-actuators each comprise at least one inactive portion and at least one active portion, the at least one active portion is movably received in the corresponding at least one inactive portion; the at least one inactive portion is comb-shaped with a plurality of slots therein, and the at least one active portion includes a shaft and a plurality of comb fingers extending from a circumference of the shaft.

12. The objective lens actuator as described in claim 11, wherein the shaft has a portion that protrudes out of the inactive portion, the protruding portion of the shaft having at least one stop portion determined at an end thereof, at least one receiving groove being defined in the lens holder for receiving the stop portion.

13. An optical pickup unit for reading information recorded in an optical disk, the optical pickup unit comprising:
a light source configured to generate a light beam;
an objective lens configured to focus the light beam to the optical disk;

an optical detector configured to receive a return light beam reflected from the optical disk; and an objective lens actuator configured to drive the objective lens, the objective lens actuator comprising:
  a lens holder configured to hold the objective lens, the lens holder comprising:
    a first surface; and
    a second surface, the second surface extending substantially perpendicular to the first surface;
  a first micro-actuator attached to the first surface, the first micro-actuator capable of being actuated to apply a first force to the lens holder, so as to drive the lens holder to move along a radial direction with respect to the optical disk; and
  a second micro-actuator attached to the second surface, the second micro-actuator capable of being actuated to apply a second force to the lens holder, so as to drive the lens holder to move along a direction substantially perpendicular to the optical disk;
  wherein the first and second micro-actuators each comprise at least one inactive portion and at least one active portion, the at least one active portion is movably received in the corresponding inactive portion.

14. The optical pickup unit as described in claim 13, wherein the second micro-actuator defines a through hole, allowing the light beam generated from the light source to be focused by the objective lens to the optical disk while the objective lens is driven by the lens holder to move along the direction substantially perpendicular to the optical disk.

15. The optical pickup unit as described in claim 13, wherein the at least one inactive portion is comb-shaped with a plurality of slots therein, and the at least one active portion includes a shaft and a plurality of comb fingers extending from a circumference of the shaft, the comb fingers are received in the corresponding slots.

* * * * *

UNITED STATES PATENT AND TRADEMARK OFFICE
CERTIFICATE OF CORRECTION

PATENT NO.       : 7,627,877 B2                                          Page 1 of 1
APPLICATION NO.  : 11/301580
DATED            : December 1, 2009
INVENTOR(S)      : Ga-Lane Chen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1011 days.

Signed and Sealed this

Second Day of November, 2010

David J. Kappos
*Director of the United States Patent and Trademark Office*